(12) United States Patent
Scipione et al.

(10) Patent No.: US 9,179,451 B2
(45) Date of Patent: Nov. 3, 2015

(54) APPARATUS AND METHODS OF FREQUENCY SPECTRUM USAGE IN A WIRELESS COMMUNICATION SYSTEM

(71) Applicant: QUALCOMM Incorporated, San Diego, CA (US)

(72) Inventors: Mario Mark Scipione, Del Mar, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/099,609

(22) Filed: Dec. 6, 2013

(65) Prior Publication Data

US 2014/0248917 A1    Sep. 4, 2014

Related U.S. Application Data

(60) Provisional application No. 61/772,088, filed on Mar. 4, 2013.

(51) Int. Cl.
| | | |
|---|---|---|
| H04W 72/04 | (2009.01) | |
| H04L 5/00 | (2006.01) | |
| H04W 48/08 | (2009.01) | |

(52) U.S. Cl.
CPC ......... *H04W 72/0406* (2013.01); *H04L 5/0037* (2013.01); *H04L 5/0092* (2013.01); *H04W 48/08* (2013.01); *H04W 72/0453* (2013.01)

(58) Field of Classification Search
CPC ..... H04W 48/14; H04W 4/027; H04W 48/00; H04W 48/02; H04W 48/04; H04W 48/06; H04W 48/10; H04W 48/08; H04W 48/12; H04W 48/16; H04W 48/17; H04W 48/18; H04W 48/20; H04W 64/00; H04W 64/03

USPC .......... 455/509, 522, 452.1, 452.2, 450, 464, 455/9, 515, 516, 67.16, 69, 115.2, 150.1, 455/177.1, 168.1, 188.1; 370/329, 336
See application file for complete search history.

(56) References Cited

U.S. PATENT DOCUMENTS

| | | | | |
|---|---|---|---|---|
| 8,991,260 B2* | 3/2015 | Kunimi | ................... | E21D 9/003 73/645 |
| 2009/0274073 A1* | 11/2009 | Sutton | ..................... | H04W 4/20 370/280 |

(Continued)

OTHER PUBLICATIONS

3GPP TSG RAN Meeting #59, "Scalable UMTS FDD Bandwidth," China Unicom, Vienna, Austria, Feb. 26-Mar. 1, 2013, 5 pages.

(Continued)

*Primary Examiner* — Tan H Trinh
(74) *Attorney, Agent, or Firm* — Arent Fox LLP

(57) ABSTRACT

Techniques of frequency spectrum usage in a wireless communication system include configuring two or more downlink carriers, each having a downlink carrier center frequency, to have a total occupied bandwidth that is constrained within an allocated downlink frequency spectrum. Further, the techniques include transmitting, to a user equipment (UE), two or more downlink carrier center frequency indicators that each identify a downlink carrier center frequency of each of the two or more downlink carriers. Also, the present techniques may include transmitting, to the UE, at least one uplink carrier center frequency indicator that at least relatively identifies at least one uplink carrier center frequency of at least one uplink carrier that is configured to have an independent, variable offset relative to one or more of the more than two downlink carriers. As such, these aspects allow new ways of squeezing carriers into the downlink while not impacting UE transmitter complexity.

26 Claims, 8 Drawing Sheets

(56) References Cited

U.S. PATENT DOCUMENTS

| | | | |
|---|---|---|---|
| 2010/0135226 A1* | 6/2010 | Chandramouli et al. | 370/329 |
| 2011/0064042 A1* | 3/2011 | Kim et al. | 370/329 |
| 2011/0080883 A1* | 4/2011 | Prakash et al. | 370/329 |
| 2011/0090853 A1* | 4/2011 | Chandramouli et al. | 370/329 |
| 2011/0249657 A1 | 10/2011 | Kishiyama et al. | |
| 2012/0113941 A1* | 5/2012 | Chung et al. | 370/329 |
| 2013/0003672 A1* | 1/2013 | Dinan | 370/329 |
| 2013/0010715 A1* | 1/2013 | Dinan | 370/329 |
| 2013/0028204 A1* | 1/2013 | Dinan | 370/329 |
| 2013/0051355 A1* | 2/2013 | Hong | 370/329 |
| 2013/0065623 A1 | 3/2013 | Gummadi et al. | |
| 2013/0077551 A1 | 3/2013 | Lo et al. | |
| 2013/0107838 A1* | 5/2013 | Li et al. | 370/329 |
| 2013/0121265 A1* | 5/2013 | Awoniyi et al. | 370/329 |
| 2013/0143502 A1 | 6/2013 | Kazmi et al. | |
| 2013/0176952 A1* | 7/2013 | Shin et al. | 370/329 |
| 2014/0105165 A1* | 4/2014 | Dinan | 370/329 |

OTHER PUBLICATIONS

QUALCOMM, "Scalable—UMTS Optimal Solution for Refarming Fragmented GSM Spectrum," 11 pages, Feb. 28, 2013.

Nokia Siemens Networks, "On Scalable Networks," 3GPP TSG RAN WG1 Meeting #72, Malta, Jan. 28-Feb. 1, 2013.

Ericsson, "Initial Considerations on Scalable UMTS," 3GPP TSG RAN WG1 Meeting #72, St. Julian's, Malta, Jan. 28-Feb. 1, 2013.

China UNICOM, "Scalable UMTS Deployment Scenarios," 3GPP TSG RAN WG1 Meeting #72, St. Julian's, Malta, Jan. 28-Feb. 1, 2014.

International Search Report & Written Opinion issued in PCT/US2014/018240, mailed May 28, 2014, 13 pages.

* cited by examiner

APPARATUS AND METHODS OF FREQUENCY SPECTRUM USAGE IN A WIRELESS COMMUNICATION SYSTEM

CLAIM OF PRIORITY UNDER 35 U.S.C. §119

The present Application for Patent claims priority to Provisional Application No. 61/772,088 entitled "APPARATUS AND METHODS OF FREQUENCY SPECTRUM USAGE IN A WIRELESS COMMUNICATION SYSTEM" filed Mar. 4, 2013, and assigned to the assignee hereof and hereby expressly incorporated by reference herein.

BACKGROUND

Aspects of the present disclosure relate generally to wireless communication systems, and more particularly, to apparatus and methods of frequency spectrum usage for communications in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, there is an ever increasing desire to maximize the use of allocated spectrum. While a great deal of focus has been in areas of carrier aggregation (e.g., multi-carrier), related to both the downlink (DL) and uplink (UL), packing that spectrum into an operator's allocated spectrum has not received as much attention.

Thus, there is a desire for further improvements in the use of allocated spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of frequency spectrum usage for communications in a wireless communication system is described. The method may include configuring, at a radio network subsystem, at least a first and second downlink carrier to have a total occupied bandwidth that is constrained within an allocated downlink frequency spectrum, the first downlink carrier having a first downlink carrier center frequency and the second downlink carrier having a second downlink carrier center frequency. The method may include transmitting, from the radio network subsystem to a user equipment (UE), at least a first and second downlink carrier center frequency indicator. The first downlink carrier center frequency indicator identifies the first downlink carrier center frequency of the first downlink carrier, and the second downlink carrier center frequency indicator identifies the second downlink carrier center frequency of the second downlink carrier. The method may include transmitting, from the radio network subsystem to the UE, at least one uplink carrier center frequency indicator that at least relatively identifies at least one uplink carrier center frequency of at least one uplink carrier to be transmitted by the UE to the radio network subsystem within an allocated uplink frequency spectrum. The at least one uplink carrier is configured by the radio network subsystem to have an independent, variable offset relative to the at least first and second downlink carriers.

In an aspect, a computer program product comprising a computer-readable medium comprising code is described. The code may be executable for configuring, at a radio network subsystem, at least a first and second downlink carrier to have a total occupied bandwidth that is constrained within an allocated downlink frequency spectrum, the first downlink carrier having a first downlink carrier center frequency and the second downlink carrier having a second downlink carrier center frequency. The code may be executable for transmitting, from the radio network subsystem to a user equipment (UE), at least a first and second downlink carrier center frequency indicator. The first downlink carrier center frequency indicator identifies the first downlink carrier center frequency of the first downlink carrier, and second downlink carrier center frequency indicator identifies the second downlink carrier center frequency of the second downlink carrier. The code may be executable for transmitting, from the radio network subsystem to the UE, at least one uplink carrier center frequency indicator that at least relatively identifies at least one uplink carrier center frequency of at least one uplink carrier to be transmitted by the UE to the radio network subsystem within an allocated uplink frequency spectrum. The at least one uplink carrier is configured by the radio network subsystem to have an independent, variable offset relative to the at least first and second downlink carriers.

In an aspect, a radio network subsystem apparatus is described. The radio network subsystem apparatus may include means for configuring at least a first and second downlink carrier to have a total occupied bandwidth that is constrained within an allocated downlink frequency spectrum, the first downlink carrier having a first downlink carrier center frequency and the second downlink carrier having a second downlink carrier center frequency. The radio network subsystem apparatus may include means for transmitting, to a user equipment (UE), at least a first and second downlink carrier center frequency indicator. The first downlink carrier center frequency indicator identifies the first downlink carrier center frequency of the first downlink carrier, and second downlink carrier center frequency indicator identifies the second downlink carrier center frequency of the second downlink carrier. The radio network subsystem apparatus may include means for transmitting, to the UE, at least one uplink carrier center frequency indicator that at least relatively identifies at least one uplink carrier center frequency of at least one uplink carrier to be transmitted by the UE to the radio network subsystem within an allocated uplink frequency spectrum. The at least one uplink carrier is configured by the radio network subsystem to have an independent, variable offset relative to the at least first and second downlink carriers.

In an aspect, a radio network subsystem apparatus is described. The radio network subsystem apparatus may include a configuration component for configuring at least a first and second downlink carrier to have a total occupied bandwidth that is constrained within an allocated downlink frequency spectrum, the first downlink carrier having a first downlink carrier center frequency and the second downlink carrier having a second downlink carrier center frequency. The radio network subsystem apparatus may include a transmitter. The transmitter may be for transmitting, to a user equipment (UE), at least a first and second downlink carrier center frequency indicator. The first downlink carrier center frequency indicator identifies the first downlink carrier center frequency of the first downlink carrier, and second downlink carrier center frequency indicator identifies the second downlink carrier center frequency of the second downlink carrier. The transmitter may be for transmitting, to the UE, at least one uplink center carrier frequency indicator that at least relatively identifies at least one uplink carrier center frequency of at least one uplink carrier to be transmitted by the UE to the radio network subsystem within an allocated uplink frequency spectrum. The at least one uplink carrier is configured by the radio network subsystem to have an independent, variable offset relative to the at least first and second downlink carriers.

In an aspect, a method of frequency spectrum usage for communications of a user equipment (UE) in a wireless communication system is described. The method may include receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency. The method may include receiving, from the radio network subsystem, at least one uplink carrier center frequency indicator that at least relatively identifies at least one uplink carrier center frequency of at least one uplink carrier to be transmitted by the UE within an allocated uplink frequency spectrum. The at least one uplink carrier is configured by the radio network subsystem to have an independent, variable offset relative to the at least first and second downlink carriers. The method may include configuring a transmission component to transmit at least one corresponding uplink carrier based on the uplink carrier center frequency indicator.

In an aspect, a computer program product, comprising a computer-readable medium comprising code is described. The code may be executable for receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency. The code may be executable for receiving, from the radio network subsystem, at least one uplink carrier center frequency indicator that at least relatively identifies at least one uplink carrier center frequency of at least one uplink carrier to be transmitted by the UE within an allocated uplink frequency spectrum. The at least one uplink carrier is configured by the radio network subsystem to have an independent, variable offset relative to the at least first and second downlink carriers. The code may be executable for configuring a transmission component to transmit the uplink carrier based on the uplink center frequency indicator.

In an aspect, a user equipment apparatus is described. The user equipment apparatus may include means for receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency. The user equipment apparatus may include means for receiving, from the radio network subsystem, at least one uplink carrier center frequency indicator that at least relatively identifies at least one uplink carrier center frequency of at least one uplink carrier to be transmitted by the UE within an allocated uplink frequency spectrum. The at least one uplink carrier is configured by the radio network subsystem to have an independent, variable offset relative to the at least first and second downlink carriers. The user equipment apparatus may include means for configuring a transmission component to transmit the uplink carrier based on the uplink center frequency indicator.

In an aspect, a user equipment apparatus is described. The user equipment apparatus may include a receiver. The receiver may be for receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency. The receiver may be for receiving, from the radio network subsystem, at least one uplink carrier center frequency indicator that at least relatively identifies at least one uplink carrier center frequency of at least one uplink carrier to be transmitted by the UE within an allocated uplink frequency spectrum. The at least one uplink carrier is configured by the radio network subsystem to have an independent, variable offset relative to the at least first and second downlink carriers. The user equipment apparatus may include a configuration component for configuring a transmission component to transmit the uplink carrier based on the uplink center frequency indicator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
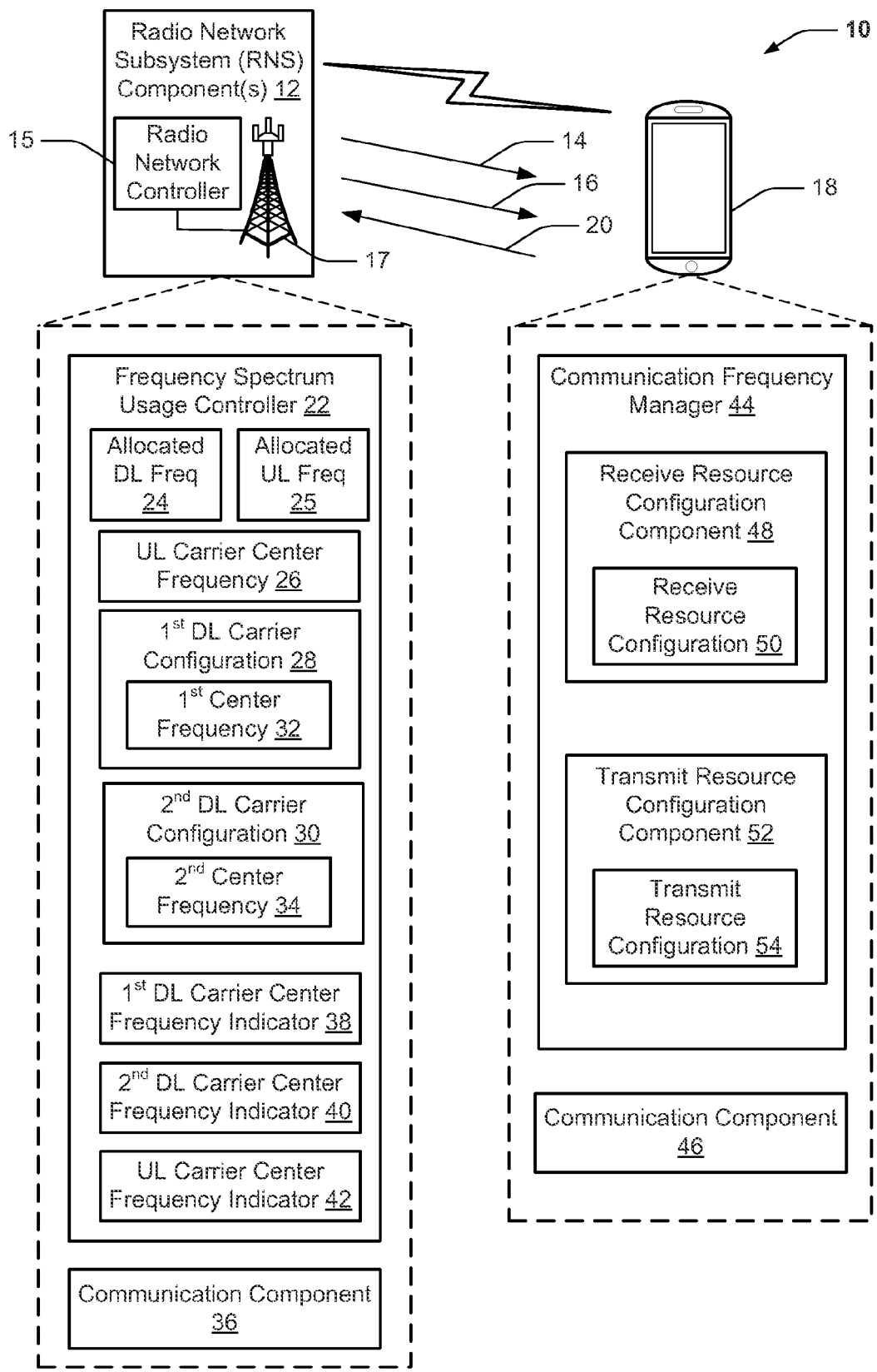
FIG. 1 is a block diagram illustrating an example wireless communication system having aspects related to frequency spectrum usage.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

According to the present aspects, a downlink (DL) carrier occupied bandwidth can be reduced through radio network subsystem techniques for manipulating carrier bandwidth. In other words, a radio network subsystem (e.g., a radio network controller (RNC) and one or more Node Bs or base stations) of the present aspects may be configured to alter a waveform of one or more DL carriers to squeeze or otherwise fit more DL carriers into an allocated DL frequency spectrum. For example, in an aspect, the apparatus and methods described herein may include the radio network subsystem, e.g., the base station, having a channel or band pass filter and the radio network subsystem, e.g., the radio network controller, configuring transmissions of DL carriers to encroach on the edge of the filter, which correspond to an edge of allocated bandwidth or spectrum. Alternative or additional aspects may include configuring the one or more DL carriers to have a certain amount of overlap in their respective frequency ranges. Other alternative or additional aspects may include configuring the one or more DL carriers to have an altered frequency range, such as by filtering edges of the frequency range to reduce the transmitted frequency range of the respective DL carrier. As such, the radio network subsystem of the present aspects configures the DL carriers such that a total occupied bandwidth is constrained within the allocated bandwidth or spectrum. Additionally, the present aspects include the radio network subsystem being configured to flexibly configure or otherwise position, e.g., independent of wireless communication protocol standards, at least one corresponding uplink (UL) carrier within an allocated UL frequency spectrum, and signal to a respective user equipment (UE) the location of the at least one corresponding UL carrier. In other words, for example, the present aspects allow for asymmetric DL and UL carrier bandwidth/spectrum usage, which enables more flexibility for deployment and for matching traffic patterns.

In a use case, for example, the present aspects may pack a standard Universal Mobile Telecommunications System (UMTS) carrier with a new type of reduced bandwidth carrier, such as a scalable UMTS (S-UMTS) carrier, into, e.g., 6 Megahertz (MHz) of spectrum allocated to an operator. For example, and in some cases, the present aspects may include a first DL carrier having a spectrum or frequency range greater than a spectrum or frequency range of a second DL carrier, in one use case, for instance, a first DL carrier may have a spectrum or frequency range of 3.8 MHz, while a second DL carrier may have a spectrum or frequency range of 1.2 MHz. In another use case, and for example, a first DL carrier may have a spectrum or frequency range of 4.2 MHz, while a second DL carrier may have a spectrum or frequency range of 1.8 MHz.

It should be understood, however, that the present aspects may be configured to operate a first DL carrier and a second DL carrier with any number of respective frequency ranges within an allocated frequency spectrum. It should also be noted, however, that the present aspects are not limited to relatively small spectrum allocations, e.g., 6 MHz, but, rather, may be applied to any spectrum allocation including spectrum allocations much larger than 6 MHz. Moreover, it should be noted that the present aspects may apply to N DL carriers, where N has a value equal to or greater than two e.g., N≥2), and, correspondingly, up to a maximum of N−1 UL carriers.

In other words, the present aspects include one or more techniques to allow new ways of squeezing two or more carriers in the DL while not impacting transmitter complexity, e.g., with respect to at least one corresponding UL carrier of the UE. For example, in one aspect, the present aspects combine a constrained channel/band filter (e.g., more narrow than a conventional filter) or simply tune the channel center frequency such that the occupied bandwidth of the DL carrier signal is impinging on the edge mask of the transmit filter to reduce a carrier's transmit signal while still meeting regulatory requirements. This solution may also include modification of a transmit power level to meet the same, or similar, requirements.

Moreover, in some aspects, the present aspects may configure the two or more DL carriers to overlap within the allocated DL spectrum, while in other aspects they may or may not overlap. In some aspects, overlapping the bandwidth or frequency range of two or more DL carriers may be preferred over configuring one or more of the respective bandwidths or frequency ranges such that it would be extending outside of the allocated DL spectrum if it were not filtered or otherwise constrained; while in other cases a configuration where the two or more DL carriers extend outside of the allocated DL spectrum may be preferred.

Moreover, in some optional or additional aspects, the two or more DL carriers may have individually reduced or filtered bandwidths or frequency ranges. For example, the two or more DL carriers may be separately constrained such that the two or more DL carrier bandwidths or frequency ranges do not overlap each other, e.g., such as by respectively extending over the band edge on the respective sides of the allocated DL spectrum.

As such, the present aspects enable a radio network subsystem, including a radio network controller, to configure the two or more DL carriers to have a total occupied bandwidth that is constrained within the allocated bandwidth or spectrum.

In another additional or complementary aspect, the present apparatus and methods may take advantage of multi-carrier operation in the spectrum of interest, or across bands. Specifically, given contiguous carriers that are being aggregated, or even a dual band multi-carrier scenario combined with multiple available carriers in a given band, the present aspects use network planning to avoid configuration of one of the paired UL carriers. In other words, according to the present aspects, a radio network subsystem may configure a first DL carrier and a second DL carrier to have a total occupied bandwidth that is constrained within an allocated bandwidth, and, further, may configure or otherwise instruct the UE to configure only a single UL carrier that corresponds to both the first DL carrier and the second DL carrier (e.g., as opposed to separate UL carriers for each DL carrier).

Additionally, in a further additional or complementary aspect, the present aspects may use a modified transmit-receive (TX-RX) frequency separation between the DL and UL signals for one or more of the DL carriers in the group being squeezed into the allocated spectrum. In other words, the radio network subsystem, including the radio network controller, may configure the UL carrier to have an independent, variable offset relative to the at least first and second downlink carriers. For example, the present aspects may include a UE transmitter configured to meet requirements for the operator's band/channel/spectrum allocation, without modifying the UE transmitter to operate with reduced bandwidth. For instance, overlap of DL and/or UL signals is allowed within an operator's licensed spectrum (e.g., with known self-degradation); however, the operator would need co-ordination for proper co-existence with neighboring operators and band edge masks. There may be many variants of these aspects. For example, in one case, the present aspects may include a radio network subsystem-specified, independent (relative to wireless communication protocols standards) offset between dual DL carriers (e.g., two contiguous carriers) with a single UL carrier. In this case, the present aspects may achieve trunking gains of the two DL carriers (e.g., supplemental DL carrier(s)) with some loss due to overlapping DL spectrum. An amount of the loss may be controlled by controlling an amount of the overlap between the two DL carriers. This aspect can be combined with S-UMTS (as described above) such that the second DL carrier is a fraction of the anchor or primary carrier. Thus, as noted above, these aspects can also be implemented using multi-band, and/or with more than two DL carriers.

Additionally, the present aspects enable the radio network subsystem to signal a TX-RX separation to the UE, e.g., a radio network subsystem-specified, independent, variable offset, rather than the TX-RX separation being fixed within the allocated UL frequency spectrum, or band, as is currently known by the UE based on the corresponding standards.

Referring to FIG. 1, in an aspect, a wireless communication system 10 includes a radio network subsystem 12 configured to reduce occupied downlink (DL) frequencies of at least a first DL carrier 14 and a second DL carrier 16 within an allocated DL frequency spectrum 24 used in communications with user equipment (UE) 18. Radio network subsystem 12 includes a radio network controller 15 and one or more base stations or Node Bs 17. The present aspects enable radio network subsystem 12, and in particular radio network controller 15, to configure the DL carriers 14 and 16 to have a total occupied bandwidth that is constrained within the allocated DL frequency spectrum 24. Further, radio network subsystem 12 is configured to enable UE 18 to establish at least one uplink (UL) carrier 20, e.g., corresponding to at least first DL carrier 14 and second DL carrier 16, where the at least one UL carrier 20 may be independently positioned, with respect to first DL carrier 14 and second DL carrier 16, within an allocated UL frequency spectrum 25. For example, radio network subsystem 12, and in particular radio network controller 15, may configure the at least one uplink carrier to have an independent (e.g., relative to a wireless communication protocol standard), variable offset relative to at least first DL carrier 14 and second DL carrier 16. It should be noted that while the following discussion refers to first DL carrier 14 and second DL carrier 16, as well as a corresponding UL carrier 20, the present aspects may apply to any number N of DL carriers, where N is equal to two or more (e.g., N≥2), and, correspondingly, up to a maximum of N−1 number of UL carriers.

In an aspect, for example, radio network subsystem 12 may include a frequency spectrum usage controller 22 executable to configure first DL carrier 14, second DL carrier 16, and UL carrier 20, to achieve occupied DL frequency reduction and independent setup of UL carrier 20. In other words, in one case, frequency spectrum usage controller 22 may be executable to enable the radio network subsystem 12 to flexibly configure at least the DL carriers 14 and 16 to have a total occupied bandwidth that is constrained within the allocated DL frequency spectrum 24. Further, for example, frequency spectrum usage controller 22 may be executable to enable the radio network subsystem 12 to flexibly configure one of a plurality of locations, e.g., a RNC-specified variable location, of UL carrier 20 within an allocated UL frequency spectrum 25, and signal a TX-RX separation to the UE 18. In this way, the TX-RX separation may be, for example, a radio network subsystem-specified, variable offset, as opposed to being fixed within allocated UL frequency spectrum 25. For instance, frequency spectrum usage controller 22 may obtain, or have stored in a memory, information defining allocated DL frequency spectrum 24, allocated UL frequency spectrum 25, and UL carrier center frequency 26. For example, such information may be programmed into radio network subsystem 12 upon manufacture, signaled to radio network subsystem 12 by another network device, or otherwise provided to radio network subsystem 12 by an operator (or some other entity) related, to wireless communication system 10.

Additionally, frequency spectrum usage controller 22 may obtain or may calculate a first DL carrier configuration 28 and a second DL carrier configuration 30 that define characteristics of first DL carrier 14 and second DL carrier 16, respectively. For instance, frequency spectrum usage controller 22 may include a carrier configuration algorithm having a function that determines how and where to position a first center frequency 32 of first DL carrier 14 (which also may be referred to as first DL carrier center frequency 32) and a second center frequency 34 of second DL carrier 16 (which also may be referred to as second DL carrier center frequency 34) within allocated DL frequency spectrum 24. For example, such a configuration algorithm used by frequency spectrum usage controller 22 may take into account overlapping carrier frequency ranges between first DL carrier 14 and second DL carrier 16, along with any resulting interference and/or performance degradation with respect to, for example, a target interference and/or performance degradation. Similarly, in an alternate or additional aspect, the configuration algorithm of frequency spectrum usage controller 22 may take into account how far outside of allocated DL frequency spectrum 24 either or both frequency ranges of first DL carrier 14 and second DL carrier 16, respectively, may be positioned. The configuration algorithm of frequency spectrum usage controller 22 also may take into account any resulting performance degradation with respect to, for example, a target performance degradation. As such, frequency spectrum usage controller 22 may operate to obtain or generate respective DL carrier configurations that squeeze at least first DL carrier 14 and second DL carrier 16 into allocated DL frequency spectrum 24 in order to reduce an overall DL frequency spectrum relative to, for example, transmitting each carrier without overlapping spectrum and/or without extending outside of allocated DL frequency spectrum 24.

Additionally, radio network subsystem 12 may include a communications component 36 that operates based on first DL carrier configuration 28 and second DL carrier configuration 30 to respectively transmit first DL carrier 14 at first center frequency 32 and second DL carrier 16 at second center frequency 34. For example, communications component 36 of radio network subsystem 12 may be located at base station 17, and may include transmit resources, such as a transmitter and one or more transmit chain components for generating and transmitting first DL carrier 11 and second DL carrier 16. Further, communications component 36 of radio network subsystem 12 may include receive resources, such as a receiver and one or more receive chain components for tuning to one or more frequency bands to receive UL carrier 20 from UE 18. Additionally, in an aspect, communications component 36, and/or a transmitter and/or one or more transmit chain components included therein, may include a filter, such as a band pass filter, to cut off (e.g., truncate) any part of transmission of at least one of first DL carrier 14 or second DL carrier 16 that falls outside of allocated DL frequency spectrum 24.

Additionally, in an aspect, frequency spectrum usage controller 22 may be configured to generate at least a first DL carrier center frequency indicator 38, a second DL carrier center frequency indicator 40, and at least one corresponding UL carrier center frequency indicator 42. For example, frequency spectrum usage controller 22 may include an algorithm for generating first DL carrier center frequency indicator 38, second DL carrier center frequency indicator 40, and UL carrier center frequency indicator 42 from first center frequency 32, second center frequency 34, and UL carrier center frequency 26, respectively. In an aspect, for example, UL carrier center frequency indicator 42 may include, but is not limited to, at least one of an UL carrier center frequency value, a first frequency offset relative to the first DL carrier center frequency, and a second frequency offset relative to a spectrum center frequency of the allocated, frequency spectrum. Correspondingly, frequency spectrum usage controller 22 may be configured to cause communication component 36, which in this case may be located at radio network controller 15, to transmit first DL carrier center frequency indicator 38, second DL carrier center frequency indicator 40, and UL carrier center frequency indicator 42 to UE 18 to enable UE 18 to establish communications with radio network subsystem 12. Thus, as noted above, the operation of frequency spectrum usage controller 22 to generate UL carrier center frequency indicator 42 enables radio network subsystem 12 to flexibly configure at least the DL carriers 14 and 16 to have a total occupied bandwidth that is constrained within the allocated DL frequency spectrum 24, and to signal a TX-RX separation, e.g., a radio network subsystem-specified, independent, variable offset, to UE 18 such that the TX-RX separation need not be fixed within allocated UL frequency spectrum 25.

In an aspect, for example, UE 18 may include a communication frequency manager 44 configured to set up a communication component 46 of UE 18 to receive at least first DL carrier 14 and second DL carrier 16 from radio network subsystem 12, and to transmit at least UL carrier 20 to radio network subsystem 12. For example, communication component 46 of UE 18 may include receive resources, such as a receiver and one or more receive chain components for tuning to one or more frequency bands to receive first DL carrier 14 and second DL carrier 16, which have a total occupied bandwidth that is constrained within the allocated DL frequency spectrum 24. Further, communication component 46 of UE 18 may include transmit resources, such as a transmitter and one or more transmit chain components for generating and transmitting UL carrier 20 to radio network subsystem 12. In an aspect, for instance, communication frequency manager 44 may receive at least first DL carrier center frequency indicator 38 and second DL carrier center frequency indicator 40 from radio network subsystem 12. Based thereon, communication frequency manager 44 also may execute receive resource configuration component 48 having an algorithm to setup receive resources and generate a receive resource configuration 50 used by communication component 46 to tune a receiver to receive at least first DL carrier 14 and second DL carrier 16. In another aspect, for instance, communication frequency manager 44 may receive at least one UL carrier center frequency indicator 42 from radio network subsystem 12, which configures the at least one uplink carrier 20 to have an independent, variable offset relative to the at least first DL carrier 14 and second DL carrier 16. Based thereon, communication frequency manager 44 may execute transmit resource configuration component 52 having an algorithm to setup transmit resources and generate a transmit resource configuration 54 used by communication component 46 to operate a transmitter to transmit at least one UL carrier 20 to radio network subsystem 12.

Thus, according to the present aspects, wireless communication system 10 includes one or more components configured to reduce occupied DL frequencies of at least first DL carrier 14 and second DL carrier 16 within allocated DL frequency spectrum 24, and to independently establish, for example, by signaling a radio network subsystem-specified TX-RX separation, a position of UL carrier 20 within allocated UL frequency spectrum 25.

Figure 2:
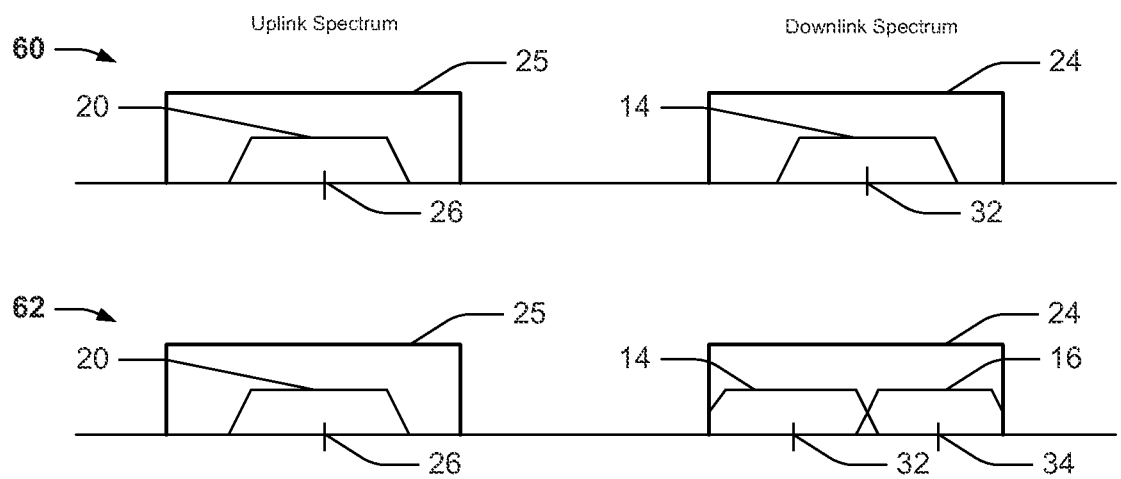
FIG. 2 is a set of graphs illustrating an example aspect of carrier configuration and spectrum usage in a wireless communication system having aspects related to frequency spectrum usage.

Referring to FIG. 2, in an aspect, a conventional spectrum allocation 60 is contrasted with a reduced occupied DL frequency allocation 62 resulting from operation of the present aspects. FIG. 2 is described with respect to the various components of FIG. 1.

In this example, a transmit-receive (TX-RX) frequency separation may be modified in reduced occupied DL frequency allocation 62 such that UL carrier center frequency 26 of UL carrier 20 is independently positioned (e.g. positioned at a radio network subsystem-specified, variable offset) from first DL carrier center frequency 32 of first DL carrier 14. Moreover, in this case, reduced occupied DL frequency allocation 62, e.g., the configuring of at least two DL carriers to have a total bandwidth that is constrained within an allocated bandwidth, includes first DL carrier 14 shifted toward a first end of allocated DL frequency spectrum 24, where one edge of the first DL carrier frequency range is configured (but not transmitted) to be located outside of an end of allocated DL frequency spectrum 24 and an opposite edge of the first DL carrier frequency range overlaps with an edge of the second DL carrier frequency range of second DL carrier 16. Further, in this case, an edge of the second DL carrier frequency range of second DL carrier 16 is configured (but not transmitted) to be located outside of another end of allocated DL frequency spectrum 24. As such, in this case, communication component 36 of radio network subsystem 12 may filter edges of the first and second frequency ranges of first DL carrier 14 and second DL carrier 16, respectively, and then transmit the filtered first DL carrier 14 and the filtered second DL carrier 16. Further, the spaced apart positioning of first DL carrier center frequency 32 and second DL carrier center frequency 34, as well as how far outside of allocated DL frequency spectrum 24 the first and second frequency ranges may be configured to extend, may be controlled to achieve or be within a respective interference target and/or performance target. Moreover, reduced occupied DL frequency allocation 62 may exclude a paired UL carrier for each DL carrier, such that UL carrier 20 of the particular case described with respect to FIG. 1 is paired with both of first DL carrier 14 and second DL carrier 16.

It should be understood that the above example illustrated by FIG. 2 is but one of many possible configurations resulting from operation of the present aspects. For example, it should be understood that, in some aspects, operation of the present aspects may include configuring at least a first DL carrier center frequency and a second DL carrier center frequency such that at least one of the first DL carrier frequency range or the second DL carrier frequency range is adjacent to an end of the allocated DL frequency spectrum, at least a part of at least one of the first DL carrier frequency range or the second DL carrier frequency range is configured such that it would be transmitted outside of the allocated DL frequency spectrum if it were not filtered, and/or at least a part of each of the first DL carrier frequency range and the second DL carrier frequency range are overlapping within the allocated DL frequency spectrum. In other words, the first DL carrier center frequency and the second DL carrier center frequency may be configured such that at least one of the above occurs. Moreover, it should be noted that radio network subsystem 12 may configure at least the first downlink carrier center frequency and the second downlink carrier center frequency such that both the first downlink carrier and the second downlink carrier are constrained within the allocated bandwidth in a similar manner, or such that each DL carrier is constrained in a different manner.

Figure 3:
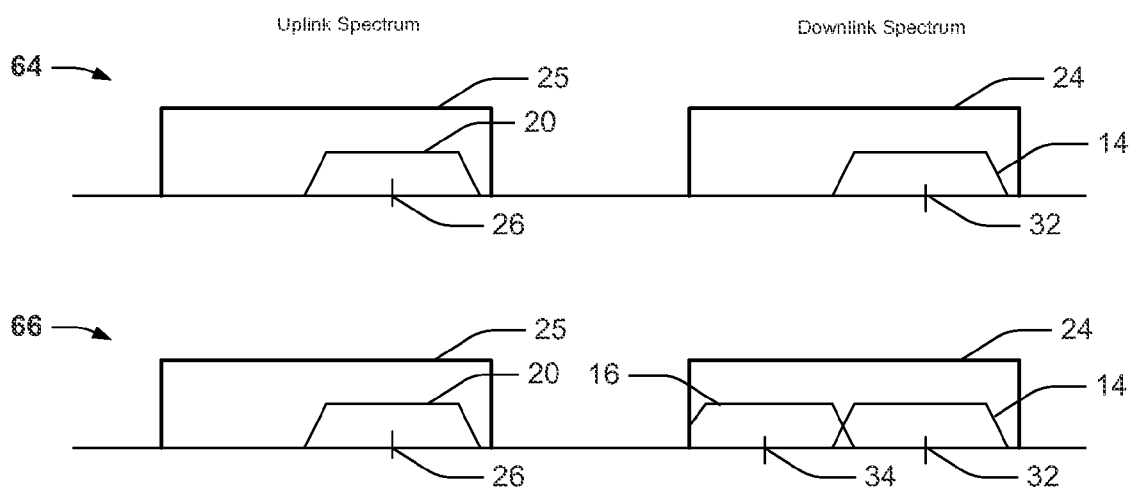
FIG. 3 is a set of graphs illustrating another example aspect of carrier configuration and spectrum usage in a wireless communication system having aspects related to frequency spectrum usage.

Referring to FIG. 3, in another aspect, a conventional spectrum allocation 64 is contrasted with a reduced occupied DL allocation 66 resulting from operation of the present aspects. This case is similar to the case described above with respect to FIG. 2; however, in this case the TX-RX frequency separation between first DL carrier 14 and UL carrier 20 may be maintained (as opposed to modifying the TX-RX frequency separation as described above with respect to FIG. 2).

Again, it should be understood that the example illustrated by FIG. 3 is but one of many possible configurations resulting from operation of the present aspects.

Figure 4:
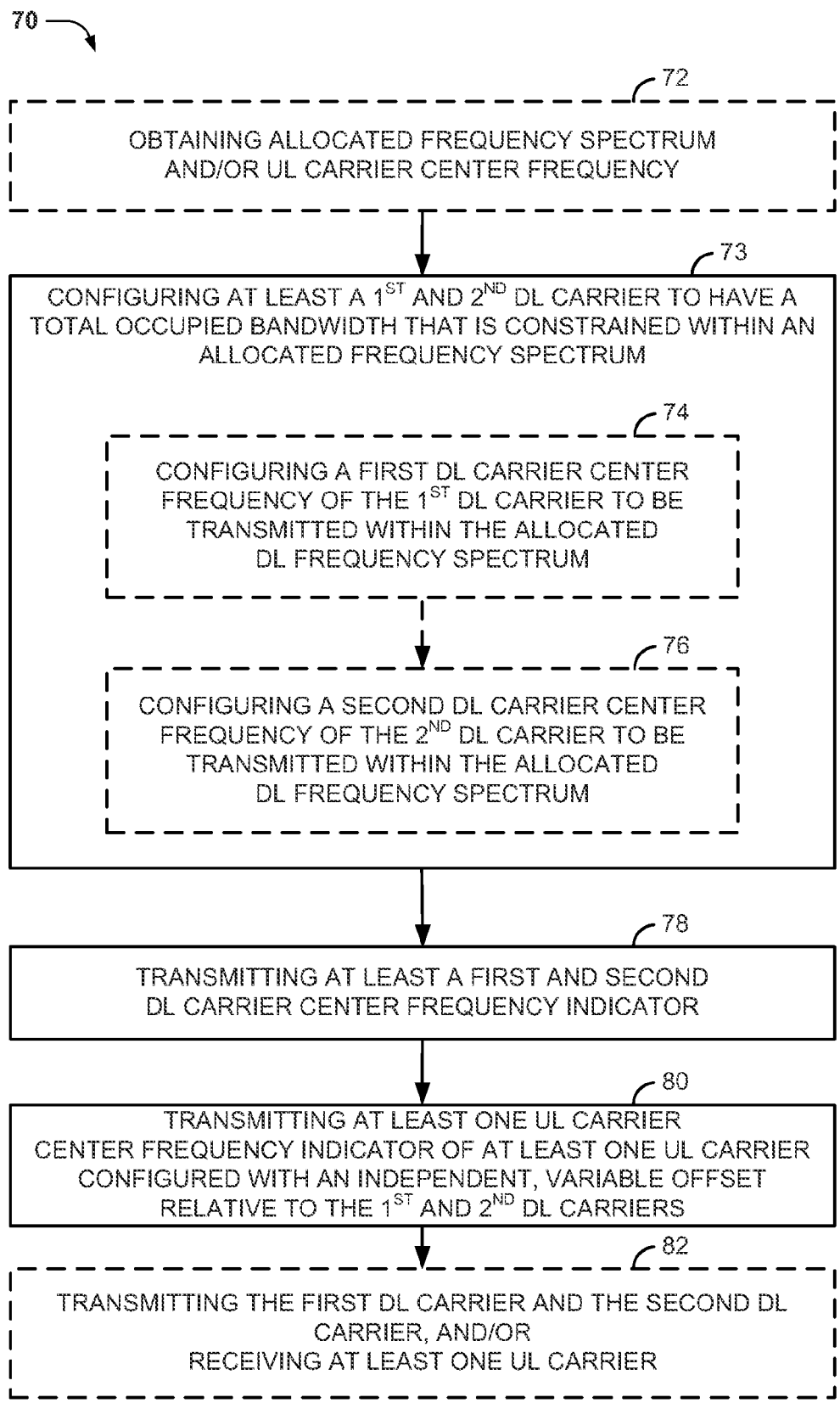
FIG. 4 is a flowchart of aspects of a method of frequency spectrum usage by a radio network subsystem for communications in a wireless communication system.

Referring to FIG. 4, aspects of a method 70 of frequency spectrum usage for communications in a wireless communication system may be executed by, for example, radio network subsystem 12 of FIG. 1. In particular, method 70 may occur based on execution of frequency spectrum usage controller 22 and communication component 36 by radio network subsystem 12, as described herein.

Initially, in an optional aspect at 72, method 70 may include obtaining, at the radio network subsystem, allocated frequency spectrum, including an allocated DL frequency spectrum and an allocated UL frequency spectrum, and/or also obtaining an UL carrier center frequency. For example, frequency spectrum usage controller 22 may be executed to obtain allocated DL frequency spectrum 24, allocated UL frequency spectrum 25, and UL carrier center frequency 26.

At 73, method 70 may include configuring, at the radio network subsystem, at least a first and second DL carrier to have a total occupied bandwidth that is constrained within allocated frequency spectrum. For example, frequency spectrum usage controller 22 may be executed to generate at least first DL carrier configuration 28 and second DL carrier configuration 30. However, according to the present aspects, N DL carriers may be configured, where N is two or more.

More specifically, at 74, operation 73 of method 70 may optionally include configuring, at the radio network subsystem, a first DL carrier center frequency of the first DL carrier to be transmitted within an allocated DL frequency spectrum. Also, at 76, operation 73 of method 70 may optionally include configuring, at the radio network subsystem, a second DL carrier center frequency of the second DL carrier to be transmitted within the allocated DL frequency spectrum. For example, frequency spectrum usage controller 22 may be executed to configure a first DL carrier center frequency 32 of the first DL carrier 14 to be transmitted within allocated DL frequency spectrum 24. Frequency spectrum usage controller 22 also may be executed to configure a second DL carrier center frequency 34 of a second DL carrier 16 to be transmitted within the allocated DL frequency spectrum 24.

For example, in an aspect, aspects of the apparatus and methods described herein may include a part of radio network subsystem 12, e.g., base station 17, having a channel or band pass filter and radio network subsystem 12 configuring transmissions of DL carriers to encroach on the edge of the filter, e.g., corresponding to an edge of allocated bandwidth or spectrum. Alternative or additional aspects may include radio network subsystem 12 configuring the one or more DL carriers to have a certain amount of overlap in their respective frequency ranges. Other alternative or additional aspects may include radio network subsystem 12 configuring the one or more DL carriers to have an altered frequency range, such as by filtering edges of the frequency range to reduce the transmitted frequency range of the respective DL carrier. As such, radio network subsystem 12 of the present aspects configures the DL carriers such that a total occupied bandwidth is constrained within the allocated bandwidth or spectrum. Moreover, it should be noted that radio network subsystem 12 may configure at least the first downlink carrier center frequency and the second downlink carrier center frequency such that both the first downlink carrier and the second downlink carrier are constrained within the allocated bandwidth in a similar manner, or such that each DL carrier is constrained in a different manner.

At 78, method 70 may include transmitting, from the radio network subsystem to a UE, at least a first and second DL carrier center frequency indicator. For example, communication component 36 may be executed to transmit at least first DL carrier center frequency indicator 38 and second DL carrier center frequency indicator 40 to UE 18.

At 80, method 70 may include transmitting, from the radio network subsystem to the UE, at least one UL carrier center frequency indicator. For example, communication component 36 may be executed to transmit UL carrier center frequency indicator 42. In an aspect, the UL carrier center frequency indicator 42 may correspond to the first DL carrier center frequency indicator 38 and second DL carrier center frequency indicator 40. In one aspect, configuring UL carrier center frequency 26 may cause a modified TX-RX frequency separation, or, in other words, a radio network subsystem-specified, variable offset; however, and in another aspect, configuring the UL carrier center frequency 26 may cause a wireless communication protocol standard-specified TX-RX frequency separation to be maintained.

In an aspect, communication component 36 may be executed to transmit the UL carrier center frequency indicator 42 by transmitting at least one of an UL carrier center frequency value, a first frequency offset relative to the first DL carrier center frequency, and a second frequency offset relative to a spectrum center frequency of the allocated DL frequency spectrum 24.

It should be understood that, there may be one or more UL carriers, and more specifically that the number of UL carriers is based on the number of DL carriers such that there may be up to a maximum of N−1 UL carriers, where N is the number, e.g. two or more, of DL carriers.

In an aspect, the first DL carrier may be a first DL carrier frequency range, and the second DL carrier may be a second DL carrier frequency range. As such, frequency spectrum usage controller 22 may be executed to configure the first DL carrier center frequency 32 and the second DL carrier center frequency 34 such that one or more of the following occurs: (1) at least one of the first DL carrier frequency range or the second DL carrier frequency range is adjacent to an end of the allocated DL frequency spectrum 24, (2) at least a part of at least one of the first DL carrier frequency range or the second DL carrier frequency range is configured such that it would be transmitted outside of the allocated DL frequency spectrum 24 if it were not filtered, and/or (3) at least a part of each of the first DL carrier frequency range and the second DL carrier frequency range are overlapping within the allocated DL frequency spectrum 24.

At 82, method 70 optionally may include transmitting at least the first DL carrier and the second DL carrier, and/or receiving at least the DL carrier. For example, communication component 36 may be executed to configure radio network subsystem 12, to transmit at least the first DL carrier 14 and the second DL carrier 16 to, for example, UE 18. In another example, communication component 36 may be executed to configure radio network subsystem 12 to receive at least the UL carrier 20 from, for example, UE 18.

In an aspect, communication component 36 may be executed to transmit at least the first DL carrier 14 by filtering the first DL carrier 14 to cut off or truncate any transmission outside of the allocated DL frequency spectrum 24. In an aspect, communication component 36 may be executed to transmit at least the second DL carrier 16 by filtering the second DL carrier 16 to cut off or truncate any transmission outside of the allocated DL frequency spectrum 24.

Figure 5:
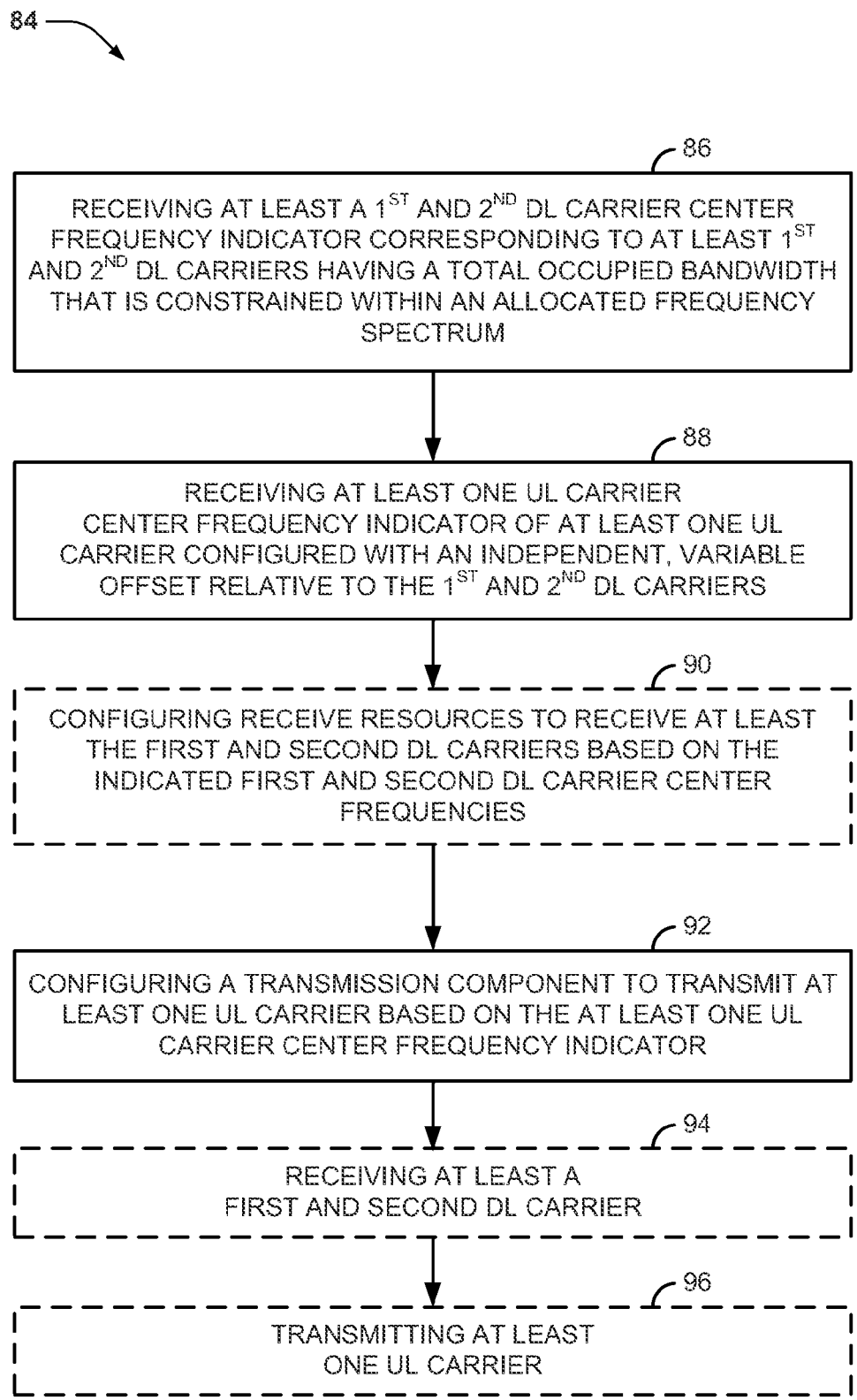
FIG. 5 is a flowchart of aspects of a method of frequency spectrum usage for communications of a user equipment in a wireless communication system.

Referring to FIG. 5, aspects of a method 84 of frequency spectrum usage for communications in a wireless communication system may be executed by, for example, a UE, such as UE 18 of FIG. 1. In particular, method 84 may occur based on execution of communication frequency manager component 44 and communication component 46 by UE 18, as described herein.

At 86, method 84 may include receiving, from a base radio network subsystem, at least first and second DL carrier center frequency indicators corresponding to at least first and second DL carriers having a total occupied bandwidth that is constrained within an allocated frequency spectrum. For example, communication component 46 may be executed to receive at least first DL carrier center frequency indicator 38 and second DL carrier center frequency indicator 40 from radio network subsystem 12.

In an aspect, the first DL carrier center frequency indicator 38 identifies a first DL carrier center frequency 32 of a first DL carrier 14 transmitted by the radio network subsystem 12 within an allocated DL frequency spectrum 24. Similarly, and in an aspect, the second DL carrier center frequency indicator 40 identifies a second DL carrier center frequency 34 of a second DL carrier 16 transmitted by the radio network subsystem 12 within the allocated DL frequency spectrum 24. In an aspect, radio network subsystem 12 may configured a position of the second DL carrier center frequency 34 within the allocated DL frequency spectrum 24 to be different from a position of the first DL carrier center frequency 32.

In an aspect, the first DL carrier center frequency indicator 38 may be a first DL carrier frequency range, the second DL carrier center frequency indicator 40 may be a second DL carrier frequency range, such that first DL carrier configuration 28 and second DL carrier configuration 30 are selected such that the first DL carrier frequency range or the second DL carrier frequency range is adjacent to an end of the allocated DL frequency spectrum 24, at least a part of at least one of the first DL carrier frequency range or the second DL carrier frequency range is outside of the allocated DL frequency spectrum 24, and/or at least a part of each of the first DL carrier frequency range and the second DL carrier frequency range are overlapping within the allocated DL frequency spectrum 24. It should be understood that there may be N DL carriers, where N is two or more.

Also, at 88, method 84 may include receiving, from the radio network subsystem, at least one corresponding UL carrier center frequency indicator that at least relatively identifies at least one UL carrier center frequency of at least one UL carrier to be transmitted by the UE to radio network subsystem 12 within an allocated UL frequency spectrum, wherein the UL carrier is configured with an independent, variable offset relative to the first and second DL carriers. For example, communication component 46 may be executed to receive at least UL carrier center frequency indicator 42 that relatively identifies UL carrier center frequency 26 of at least one UL carrier 20 to be transmitted by UE 18 to radio network subsystem 12 within allocated UL frequency spectrum 25. In an aspect, at least one UL carrier 20 corresponds to, or is paired with, at least the first DL carrier 14 and the second DL carrier. In an aspect, the UL carrier center frequency 26 is positionable within the allocated UL frequency spectrum 25 independently from a position of the first DL carrier center frequency 32 of the first DL carrier 14. In other words, the UL carrier center frequency 26 is at an independent, radio network subsystem-specified, variable offset from any DL carrier center frequency of any DL carrier. In an aspect, communication component 46 may be executed to receive the UL carrier center frequency indicator 42 by receiving at least one of an UL carrier center frequency value, a first frequency offset relative to the first DL carrier center frequency 32 of the radio network subsystem 12, and a second frequency offset relative to a spectrum center frequency of the allocated DL frequency spectrum 24. Further, it should be understood that there may be up to a maximum of N−1 UL carriers, where N is the number, e.g. two or more, of DL carriers.

At 90, method 84 may optionally include configuring receive resources to receive at least the first and second DL carriers based on the indicated first and second center frequencies. For example, receive resource configuration component 48 may be executed to configure receive resources (e.g., resulting in receive resource configuration 50) to receive at least the first DL carrier 14 and the second DL carrier 16 based on the first DL carrier center frequency indicator 38 and second DL carrier center frequency indicator 40.

At 92, method 84 may include configuring a transmission component to transmit at least the corresponding UL carrier on the second UL carrier center frequency based on the UL carrier center frequency indicator. For example, transmit resource configuration component 52 may be executed to configure communication component 46 to transmit at least the corresponding UL carrier 20 on the UL carrier center frequency 26 based on the UL carrier center frequency indicator 42.

At 94, method 84 may optionally include receiving at least a first and second DL carrier. For example, communication component 46 may be executed to receive first DL carrier 14 and second DL carrier 16.

At 96, method 84 may optionally include transmitting at least one corresponding UL carrier. For example, communication component 46 may be executed to transmit at least one UL carrier 20 that corresponds to first DL carrier 14 and second DL carrier 16.

Figure 6:
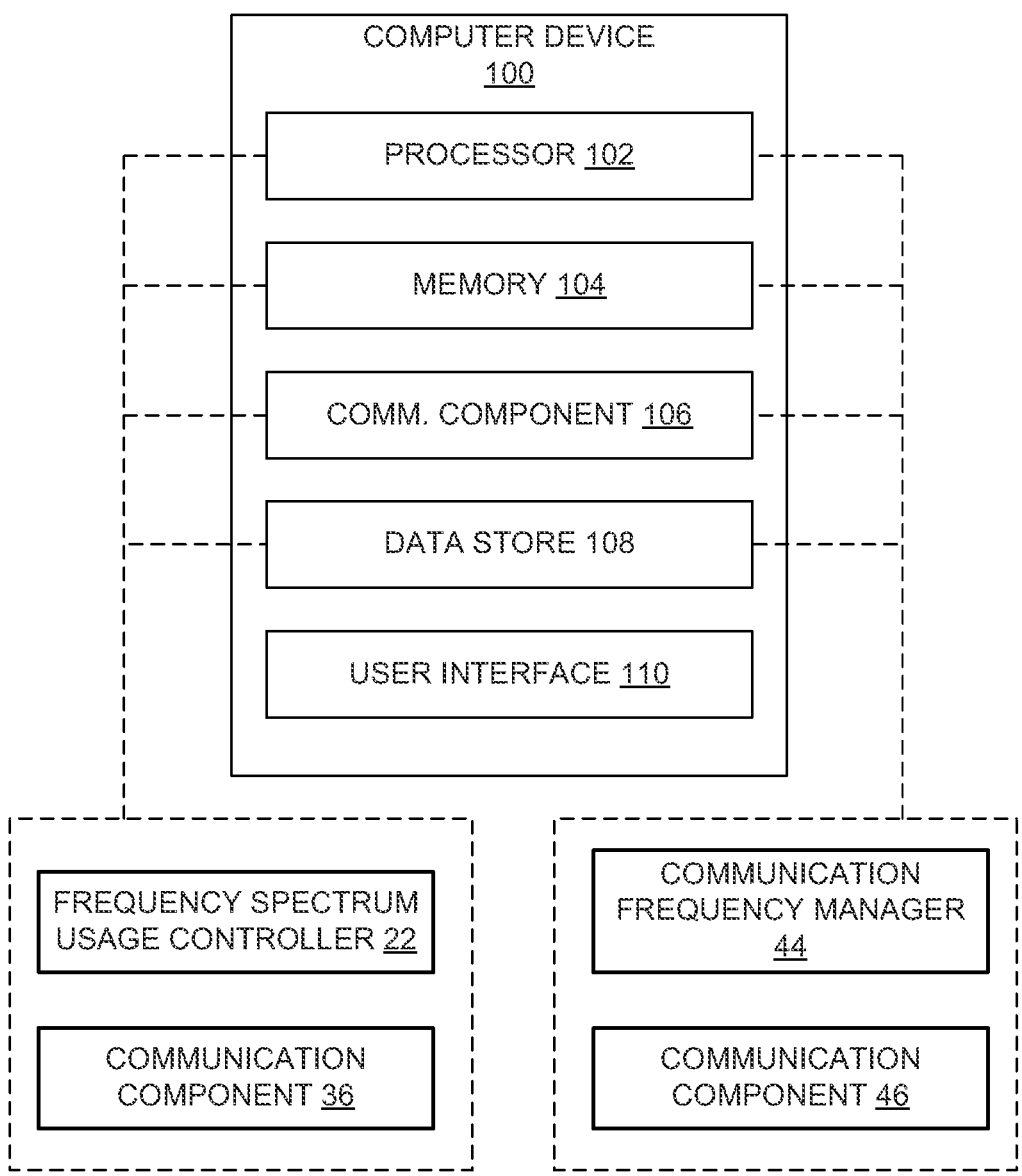
FIG. 6 is a block diagram illustrating an example computer device specially configured to perform the functions of a radio network subsystem or a user equipment, as described herein, both of which are in a wireless communication system having aspects related to frequency spectrum usage.

Referring to FIG. 6, in one aspect, radio network subsystem 12 including the frequency spectrum usage controller 22 and communication component 36, and/or UE 18 including communication frequency manager 44 and communication component 46, may be implemented by a specially programmed or configured computer device 100 having aspects configured for frequency spectrum usage according to the present aspects. More particularly, the special programming or configuring of computer device 100 may be programming or configuring to perform that respective functions described herein for the respective entity, such as for radio network subsystem 12 or UE 18.

Computer device 100 includes a processor 102 specially configured to carry out processing functions associated with one or more of components and functions described herein. Processor 102 can include a single or multiple set of processors or multi-core processors. Moreover, processor 102 can be implemented as an integrated processing system and/or a distributed processing system.

Computer device 100 further includes a memory 104, such as for storing data used herein and/or local versions of applications and/or instructions or code being executed by processor 102, such as to perform the respective functions of the respective entities described herein. Memory 104 can include any type of memory usable by a computer, such as random access memory (RAM), read only memory (ROM), tapes, magnetic discs, optical discs, volatile memory, non-volatile memory, and any combination thereof.

Further, computer device 100 includes a communications component 106 that provides for establishing and maintaining communications with one or more parties utilizing hardware, software, and services as described herein. Communications component 106 may carry communications between components on computer device 100, as well as between computer device 100 and external devices, such as devices located across a communications network and/or devices serially or locally connected to computer device 100. For example, communications component 106 may include one or more buses, and may further include transmit chain components and receive chain components associated with a transmitter and receiver, respectively, or a transceiver, operable for interfacing with external devices. It is noted that communications component 36 of radio network subsystem 12, or communication component 46 of UE 18, may be the same as communication component 106, or may operate in conjunction with communication component 106.

Additionally, computer device 100 may further include a data store 108, which can be any suitable combination of hardware and/or software, that provides for mass storage of information, databases, and programs employed in connection with aspects described herein. For example, data store 108 may be a data repository for applications not currently being executed by processor 102, such as applications for performing the functions of radio network subsystem 12 or UE 18 as described herein.

Computer device 100 may additionally include a user interface component 110 operable to receive inputs from a user of computer device 100, and further operable to generate outputs for presentation to the user. User interface component 110 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 110 may include one or more output devices, including but not limited to a display, a speaker, a haptic feedback mechanism, a printer, any other mechanism capable of presenting an output to a user, or any combination thereof.

As noted above, in an implementation for radio network subsystem 12 of FIG. 1, computer device 100 may include frequency spectrum usage controller 22 and communication component 36, such as in specially programmed computer readable instructions or code, firmware, a processor or other hardware, or some combination thereof.

Further, as noted above, in a user equipment implementation, such as for UE 18 of FIG. 1, computer device 100 may include communication frequency manager 44 and communication component 46, such as in specially programmed computer readable instructions or code, firmware, a processor or other hardware, or some combination thereof.

The various concepts presented throughout this disclosure may be implemented across a broad variety of telecommunication systems, network architectures, and communication standards.

Figure 7:
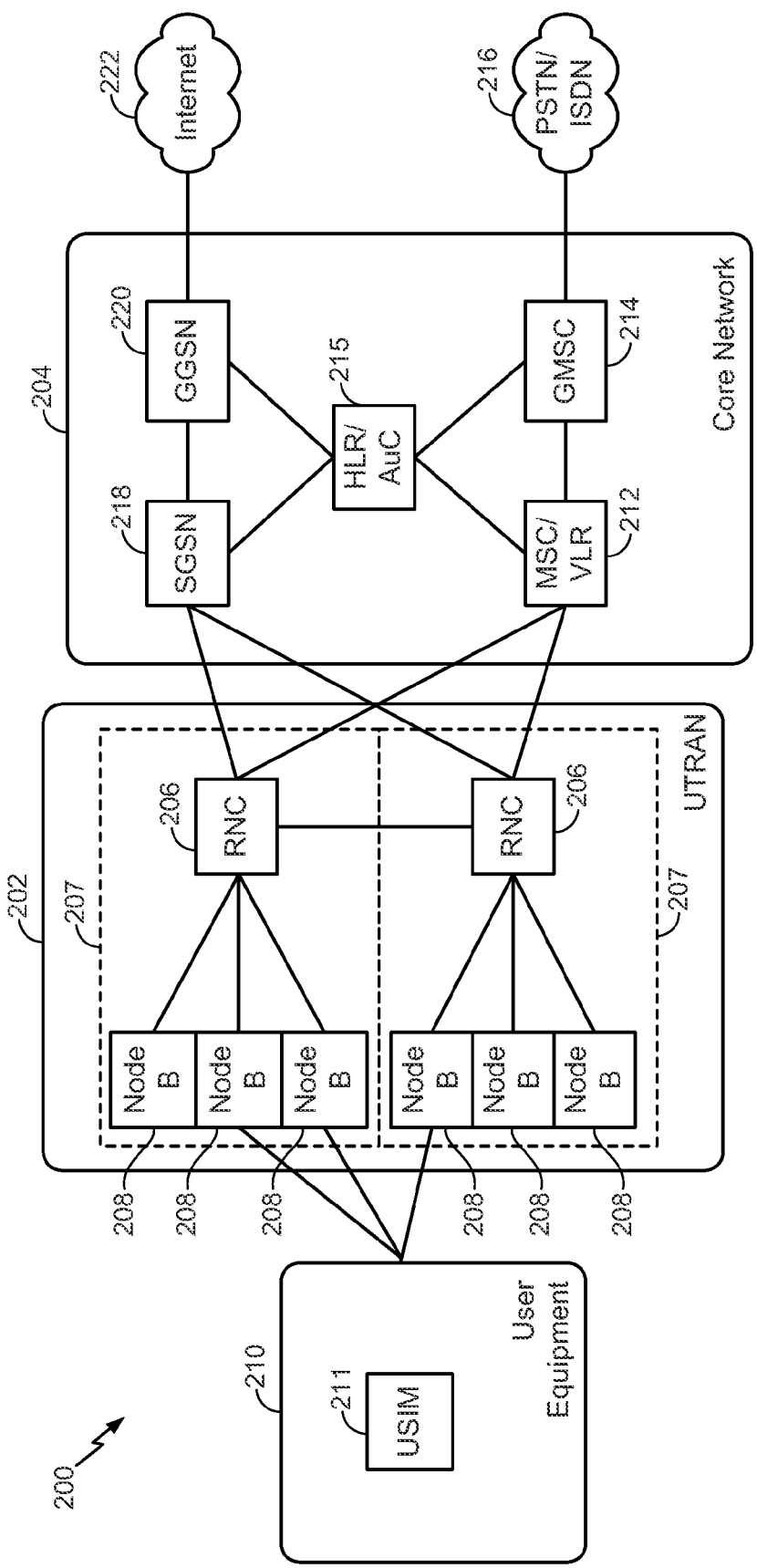
FIG. 7 is a block diagram illustrating an example of a telecommunications system having aspects related to frequency spectrum usage.

Referring to FIG. 7, by way of example and without limitation, the aspects of the present disclosure are presented with reference to a UMTS system 200 employing a WCDMA air interface, and including a radio network subsystem 207 (which may be the same as, or similar to radio network subsystem 12 of FIG. 1) executing aspects of frequency spectrum usage controller 22 and communication component 36 of FIG. 1. UMTS system 200 also may include a UE 210 (which may be the same as, or similar to, UE 18 of FIG. 1) executing aspects of communication frequency manager 44 and communication component 46.

A UMTS network includes three interacting domains: a Core Network (CN) 204, a UMTS Terrestrial Radio Access Network (UTRAN) 202, and UE 210. In this example, the UTRAN 202 provides various wireless services including telephony, video, data, messaging, broadcasts, and/or other services. The UTRAN 202 may include a plurality of Radio Network Subsystems (RNSs) such as an RNS 207, including one or more Node Bs 208, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between UE 210 and Node B 208 may be considered as including a physical (PHY) layer and a medium access control (MAC) layer. Further, communication between UE 210 and RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), radio base station, a radio transceiver, a transceiver function, a basic service set (BSS), an extended service set (ESS), a network access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses, such as UE 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UE 210 with packet-based network connectivity. Data packets may be transferred between the GGSN 220 and the UE 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" WCDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a WCDMA air interface, the underlying principles may be equally applicable to a TD-SCDMA air interface.

An HSPA air interface includes a series of enhancements to the 3G/WCDMA air interface, facilitating greater throughput and reduced latency. Among other modifications over prior releases. HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance.

Figure 8:
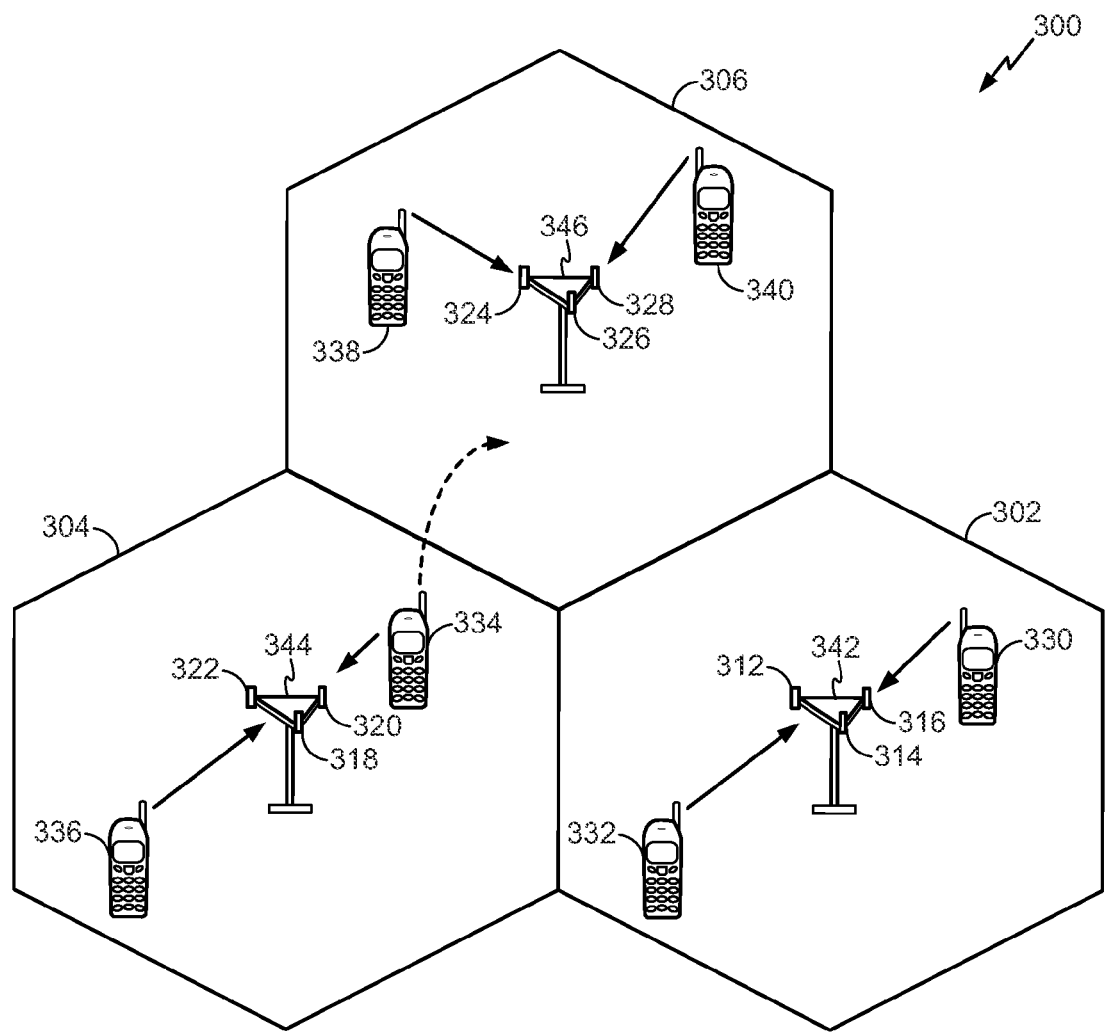
FIG. 8 is a block diagram illustrating an example of an access network having aspects related to frequency spectrum usage.

Referring to FIG. 8, an access network 300 in a UTRAN architecture is illustrated and may include a radio network subsystem, e.g., one or more base stations or Node Bs and a radio network controller, which may be the same as, or similar to, radio network subsystem 12 of FIG. 1, executing aspects of frequency spectrum usage controller 22 and communication component 36, and one or more UEs (which may be the same as, or similar to, UE 18 of FIG. 1) executing aspects of communication frequency manager 44 and communication component 46, as described herein.

The multiple access wireless communication system includes multiple cellular regions (cells), including cells 302, 304, and 306, each of which may include one or more sectors. In an aspect, any of cells 302, 304, and/or 306 may utilize the same or different radio access technologies (RATs). The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 for all the UEs 330, 332, 334, 336, 338, 340 in the respective cells 302, 304, and 306.

Further, the modulation and multiple access scheme employed by the access network 300 may vary depending on the particular telecommunications standard being deployed. By way of example, the standard may include Evolution-Data Optimized (EV-DO) or Ultra Mobile Broadband (UMB), EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (WCDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA, UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Several aspects of a telecommunications system have been presented with reference to a WCDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a UE or terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, or user device. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a radio network subsystem, including a radio network controller and one or more base stations. A base station may be utilized for communicating directly with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of frequency spectrum usage for communications in a wireless communication system, comprising:

configuring, at a radio network subsystem, at least a first and second downlink carrier to have a total occupied bandwidth that is constrained within an allocated downlink frequency spectrum, the first downlink carrier having a first downlink carrier center frequency and the second downlink carrier having a second downlink carrier center frequency;

transmitting, from the radio network subsystem to a user equipment (UE), at least a first and second downlink carrier center frequency indicator, wherein the first downlink carrier center frequency indicator identifies the first downlink carrier center frequency of the first downlink carrier, and wherein second downlink carrier center frequency indicator identifies the second downlink carrier center frequency of the second downlink carrier; and transmitting, from the radio network subsystem to the UE, at least one uplink carrier center frequency indicator that identifies at least one uplink carrier center frequency of at least one uplink carrier to be transmitted by the UE to the radio network subsystem within an allocated uplink frequency spectrum, wherein the at least one uplink carrier is configured by the radio network subsystem to have an independent, variable center frequency offset relative to the at least first and second downlink carriers.

2. The method of claim 1, wherein configuring at least the first and second downlink carrier further comprises:
configuring the first carrier center frequency of the first downlink carrier to be transmitted within the allocated downlink frequency spectrum; and
configuring the second carrier center frequency of the second downlink carrier to be transmitted within the allocated downlink frequency spectrum.

3. The method of claim 1, wherein the first downlink carrier comprises a first downlink carrier frequency range, wherein the second downlink carrier comprises a second downlink carrier frequency range, and wherein the configuring includes configuring the first downlink carrier center frequency and the second downlink carrier center frequency such that
the total occupied bandwidth is constrained by at least one of the first downlink carrier frequency range or the second downlink carrier frequency range being adjacent to an end of the allocated downlink frequency spectrum.

4. The method of claim 1, wherein the first downlink carrier comprises a first downlink carrier frequency range, wherein the second downlink carrier comprises a second downlink carrier frequency range, and wherein the configuring includes configuring the first downlink carrier center frequency and the second downlink carrier center frequency such that the total occupied bandwidth is constrained within the allocated bandwidth by at least a part of at least one of the first downlink carrier frequency range or the second downlink carrier frequency range being configured such that it would be outside of the allocated downlink frequency spectrum if not filtered.

5. The method of claim 1, wherein the first downlink carrier comprises a first downlink carrier frequency range, wherein the second downlink carrier comprises a second downlink carrier frequency range, and wherein the configuring includes configuring the first downlink carrier center frequency and the second downlink carrier center frequency such that the total occupied bandwidth is constrained within the allocated bandwidth by at least a part of each of the first downlink carrier frequency range and the second downlink carrier frequency range overlapping within the allocated downlink frequency spectrum.

6. The method of claim 1, further comprising transmitting at least the first downlink carrier including filtering the first downlink carrier to cut off any transmission outside of the allocated downlink frequency spectrum.

7. The method of claim 1, further comprising transmitting at least the second downlink carrier including filtering the second downlink carrier to cut off any transmission outside of the allocated downlink frequency spectrum.

8. The method of claim 1, wherein transmitting the uplink carrier center frequency indicator further comprises transmitting one or more of an uplink carrier center frequency value, a first frequency offset relative to the first carrier center frequency, or a second frequency offset relative to a spectrum center frequency of the allocated downlink frequency spectrum.

9. The method of claim 1, wherein,
the configuring comprises configuring, at the radio network subsystem, more than two downlink carriers within an allocated downlink frequency spectrum, each of the more than two downlink carriers having a downlink carrier center frequency; and
the transmitting comprises transmitting more than two downlink carrier center frequency indicators, wherein each of the more than two downlink carrier center frequency indicators identifies a corresponding downlink carrier center frequency of each of the more than two downlink carriers.

10. A radio network subsystem apparatus, comprising:
a configuration component for configuring at least a first and second downlink carrier to have a total occupied bandwidth that is constrained within an allocated downlink frequency spectrum, the first downlink carrier having a first downlink carrier center frequency and the second downlink carrier having a second downlink carrier center frequency;
a transmitter for:
transmitting, to a user equipment (UE), at least a first and second downlink carrier center frequency indicator, wherein the first downlink carrier center frequency indicator identifies the first downlink carrier center frequency of the first downlink carrier, and wherein second downlink carrier center frequency indicator identifies the second downlink carrier center frequency of the second downlink carrier; and
transmitting, to the UE, at least one uplink center carrier frequency indicator identifies at least one uplink carrier center frequency of at least one uplink carrier to be transmitted by the UE to the radio network subsystem within an allocated uplink frequency spectrum, wherein the at least one uplink carrier is configured by the radio network subsystem to have an independent, variable offset center frequency relative to the at least first and second downlink carriers.

11. The apparatus of claim 10, wherein the configuration component for configuring at least the first and second downlink carrier further comprises the configuration component for:
configuring the first downlink carrier center frequency of the first downlink carrier to be transmitted within the allocated downlink frequency spectrum; and
configuring the second downlink carrier center frequency of the second downlink carrier to be transmitted within the allocated downlink frequency spectrum.

12. The apparatus of claim 11, wherein the first downlink carrier comprises a first downlink carrier frequency range, wherein the second downlink carrier comprises a second downlink carrier frequency range, and wherein the configuration component for configuring comprises the configuration component for configuring the first downlink carrier center frequency and the second downlink carrier center frequency such that one or more of the following occurs:
at least one of the first downlink carrier frequency range or the second downlink carrier frequency range is adjacent to an end of the allocated downlink frequency spectrum; or
at least a part of at least one of the first downlink carrier frequency range or the second downlink carrier frequency range is configured such that it would be outside of the allocated downlink frequency spectrum if not filtered; or
at least a part of each of the first downlink carrier frequency range and the second downlink carrier frequency range are overlapping within the allocated downlink frequency spectrum.

13. The apparatus of claim 11, wherein the transmitter is further configured to filter the first downlink carrier to cut off any transmission outside of the allocated downlink frequency spectrum.

14. The apparatus of claim 11, wherein the transmitter is further configured to filter the second downlink carrier to cut off any transmission outside of the allocated downlink frequency spectrum.

15. The apparatus of claim 10, wherein the transmitter is further configured to transmit one or more of an uplink carrier center frequency value, a first frequency offset relative to the first carrier center frequency, or a second frequency offset relative to a spectrum center frequency of the allocated downlink frequency spectrum.

16. A method of frequency spectrum usage for communications of a user equipment (UE) in a wireless communication system, comprising:
receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency;
receiving, from the radio network subsystem, at least one uplink carrier center frequency indicator that identifies at least one uplink carrier center frequency of at least one uplink carrier to be transmitted by the UE within an allocated uplink frequency spectrum, wherein the at least one uplink carrier is configured by the radio network subsystem to have an independent, variable frequency offset relative to the at least first and second downlink carriers; and
configuring a transmission component to transmit at least one corresponding uplink carrier based on the uplink carrier center frequency indicator.

17. The method of claim 16, wherein receiving the uplink carrier center frequency indicator further comprises receiving one or more of an uplink carrier center frequency value, a first frequency offset relative to the first downlink carrier center frequency, or a second frequency offset relative to a spectrum center frequency of the allocated downlink frequency spectrum.

18. The method of claim 16, wherein the uplink carrier center frequency is at a radio network controller-specified offset from a position of the first downlink carrier center frequency of the first downlink carrier or the second downlink carrier center frequency of the second downlink carrier within the allocated uplink frequency spectrum.

19. The method of claim 16, wherein the first downlink carrier comprises a first downlink carrier frequency range, wherein the second downlink carrier comprises a second downlink carrier frequency range, and wherein the first downlink carrier center frequency and the second downlink carrier center frequency are configured such that
the total occupied bandwidth is constrained by at least one of the first downlink carrier frequency range or the second downlink carrier frequency range being adjacent to an end of the allocated downlink frequency spectrum.

20. The method of claim 16, wherein the first downlink carrier comprises a first downlink carrier frequency range, wherein the second downlink carrier comprises a second downlink carrier frequency range, and wherein the first downlink carrier center frequency and the second downlink carrier center frequency are configured such that the total occupied bandwidth is constrained within the allocated bandwidth by at least a part of at least one of the first downlink carrier frequency range or the second downlink carrier frequency range being outside of the allocated downlink frequency spectrum if not filtered.

21. The method of claim 16, wherein the first downlink carrier comprises a first downlink carrier frequency range, wherein the second downlink carrier comprises a second downlink carrier frequency range, and wherein the first downlink carrier center frequency and the second downlink carrier center frequency are configured such that the total occupied bandwidth is constrained within the allocated bandwidth by at least a part of each of the first downlink carrier frequency range and the second downlink carrier frequency range overlapping within the allocated downlink frequency spectrum.

22. The method of claim 16, wherein the receiving comprises, receiving from the radio network subsystem, more than two downlink carrier center frequency indicators, wherein each of the more than two downlink carrier center frequency indicators identifies a corresponding downlink carrier center frequency of one of the more than two downlink carriers transmitted within the allocated downlink frequency spectrum, wherein each of the more than two downlink carrier center frequencies have different positions within the allocated downlink frequency spectrum.

23. A user equipment apparatus, comprising:
a receiver for:
receiving, from a radio network subsystem, at least a first and second downlink carrier center frequency indicator corresponding to at least a first and second downlink carrier having a total occupied bandwidth that is constrained within an allocated downlink frequency spectrum, wherein a position of a second downlink carrier center frequency within the allocated downlink frequency spectrum is different from a position of a first downlink carrier center frequency; and
receiving, from the radio network subsystem, at least one uplink carrier center frequency indicator that identifies at least one uplink carrier center frequency of at least one uplink carrier to be transmitted by the UE within an allocated uplink frequency spectrum, wherein the at least one uplink carrier is configured by the radio network subsystem to have an independent, variable offset center frequency relative to the at least first and second downlink carriers; and
a configuration component for configuring a transmission component to transmit the uplink carrier based on the uplink center frequency indicator.

24. The apparatus of claim 23, wherein the receiver is further configured to receive at least one of an uplink carrier center frequency value, a first frequency offset relative to the first downlink carrier center frequency, or a second frequency offset relative to a spectrum center frequency of the allocated downlink frequency spectrum.

25. The apparatus of claim 23, wherein the uplink carrier center frequency is at a radio network controller-specified offset from a position of the first downlink carrier center frequency of the first downlink carrier or the second downlink carrier center frequency of the second downlink carrier within the allocated uplink frequency spectrum.

26. The apparatus of claim 23, wherein the first downlink carrier comprises a first downlink carrier frequency range, wherein the second downlink carrier comprises a second downlink carrier frequency range, and wherein the first downlink carrier center frequency and the second downlink carrier center frequency are configured such that one or more of the following occurs:

at least one of the first downlink carrier frequency range or the second downlink carrier frequency range is adjacent to an end of the allocated downlink frequency spectrum; or at least a part of at least one of the first downlink carrier frequency range or the second downlink carrier frequency range would be outside of the allocated downlink frequency spectrum if not filtered; or at least a part of each of the first downlink carrier frequency range and the second downlink carrier frequency range are overlapping within the allocated downlink frequency spectrum.

* * * * *